Jan. 13, 1953  G. B. ELLIS  2,625,575
DRY BATTERY CELL
Original Filed July 3, 1950
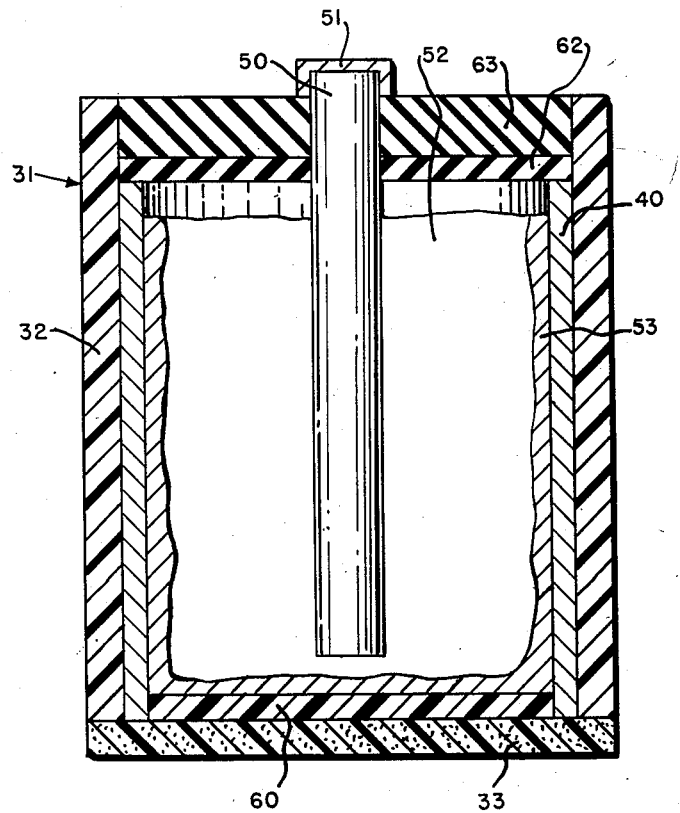
INVENTOR.
GRENVILLE B. ELLIS
BY
Harry M. Saragovitz
Attorney

Patented Jan. 13, 1953  2,625,575

UNITED STATES PATENT OFFICE 2,625,575

DRY BATTERY CELL

Grenville B. Ellis, Red Bank, N. J., assignor to the United States of America as represented by the Secretary of the Army Original application July 3, 1950, Serial No. 171,999, now Patent No. 2,572,017, dated October 23, 1951. Divided and this application July 20, 1951, Serial No. 237,821

1 Claim. (Cl. 136—107)

(Granted under Title 35, U. S. Code (1952), sec. 266)

This application is a division of parent application Serial No. 171,999 filed July 3, 1950, now U. S. Patent 2,572,017, dated October 23, 1951.

The invention described herein may be manufactured and used by or for the Government for governmental purposes, without the payment of any royalty thereon.

This invention relates to an hermetically sealed primary dry cell having a cell container made of plastic material, and more particularly to Leclanche type cells having a plastic cell container.

Many difficulties have been encountered in providing electrical circuit terminals for the electrodes within the cell through the non-conductive plastic material of the cell container, particularly because of the danger of leakage or creepage of electrolyte along the interface between the metal of the terminal and the plastic material of the cell container.

It is a general object of the present invention to eliminate the use of metallic terminals altogether by using electrically conductive plastic material in those zones of the cell container where an electrical contact through the plastic wall is desired.

Other and more detailed objects of the invention are to effect simplicity of structure and efficiency of large scale manufacture so as to provide an economic and reliable primary cell of prolonged shelf life.

Additional objects will become apparent from the following description of a preferred embodiment of the invention in its application to cells of the Leclanche type.

The drawing shows a vertical sectional view of a Leclanche type cell, which comprises a cell container 31 which consists of a tubular member 32 made of insulating plastic material. The bottom of this tubular member 32 is closed by a plate 33 of electrically conductive plastic material and secured to the tubular member 32 with the aid of a suitable adhesive. A cylindrical zinc anode 40 fits the interior walls of the tubular plastic member 32 forming the metal negative electrode of the cell. This zinc electrode 40 is in direct electrical contact with the bottom plate 33 of the cell container so that this electrically conductive plate 33 forms the anodic terminal. To prevent local couples within the cell it is preferable to use zinc powder for making the plate 33 electrically conductive.

The negative electrode of this cell comprises in known manner a centrally disposed carbon positive electrode 50 with exposed metal cup 51. The carbon electrode is surrounded by a bobbin of depolarizing mix 52. A spacer layer 53 consisting in known manner of moisture absorbent material such as paper, silica, starch or the like containing an immobilized electrolyte, is disposed between the zinc electrode 40 and the bobbin 52. An insulating disc 60 of polystyrene or other suitable dielectric material separates the cathode from internal contact with the bottom plate 33 of the cell container which serves as anodic terminal.

The insulating plastic material as used for the tubular member 2 may consist of polystyrene, ethyl cellulose, nylon, polyethylene, methylmethacrylate or any other suitable high polymer which is inert to the chemical and electrochemical reactions of the cell. The conductive plastic material used for at least part of the bottom plate 33 may consist of any one of the plastic materials mentioned before which have been made conductive by the admixture of powdered graphite, conductive metal compounds or metallic powder. The metal to be used must be such as not to set up local action with the electrolyte or to form electric couples which would interfere with the function of the cell. Since the anode consists of zinc it is preferable that the plastic be made conductive by the admixture of zinc powder.

The cell is sealed in the usual manner, for instance, by means of a paper washer 62 resting on the upper edge of the zinc electrode, and a fusible sealing material 63 commonly composed of wax, pitch or other materials known for this purpose.

While there has been described what, at present, are considered preferred embodiments of the inventive idea it will be understood by those skilled in the art that various changes, modifications and adaptations may be made therein without departing from the invention and it is therefore aimed in the appended claim to cover all such changes and modifications as fall within the spirit and scope of the present invention.

I claim:

In an hermetically sealed primary dry cell of the Leclanche type comprising a cylindrical zinc anode and a centrally disposed carbon positive electrode the protruding end of which constitutes the positive terminal; an open top plastic cell container, the walls of which consist of plastic dielectric material while at least a part of the bottom plate of said plastic cell container consists of electrically conductive plastic material made conductive by the admixture of zinc powder, said conductive plastic part of the bottom plate constituting the negative terminal of the cell; said cylindrical zinc anode fitting the interior non-conductive walls of said open top plastic cell container and being in direct electrical contact with the conductive plastic material of said bottom plate; an insulating sealing compound positioned above the upper edge of the cylindrical zinc anode and contained in the upper part of the open top cell container hermetically sealing the zinc anode within the plastic cell container.

GRENVILLE B. ELLIS.

REFERENCES CITED

The following references are of record in the file of this patent:

UNITED STATES PATENTS

| Number | Name | Date |
|---|---|---|
| 1,837,361 | Ford | Dec. 22, 1931 |
| 2,487,985 | Ruben | Nov. 15, 1949 |
| 2,572,017 | Ellis | Oct. 23, 1951 |

FOREIGN PATENTS

| Number | Country | Date |
|---|---|---|
| 562,780 | Great Britain | July 14, 1944 |